(12) United States Patent
Hayase

(10) Patent No.: US 11,736,025 B2
(45) Date of Patent: Aug. 22, 2023

(54) ELECTRICAL POWER CONVERSION APPARATUS

(71) Applicant: Mitsubishi Electric Corporation, Tokyo (JP)

(72) Inventor: Kei Hayase, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/488,943

(22) Filed: Sep. 29, 2021

(65) Prior Publication Data

US 2022/0149742 A1 May 12, 2022

(30) Foreign Application Priority Data

Nov. 12, 2020 (JP) ................................. 2020-188415

(51) Int. Cl.
*H02M 3/335* (2006.01)
*H02M 1/088* (2006.01)
(Continued)

(52) U.S. Cl.
CPC ....... *H02M 3/33573* (2021.05); *H02M 1/088* (2013.01); *H02M 1/327* (2021.05);
(Continued)

(58) Field of Classification Search
CPC .. H02M 3/33573; H02M 1/088; H02M 1/327; H02M 1/4233; H02M 5/4585;
(Continued)

(56) References Cited

U.S. PATENT DOCUMENTS 5,825,642 A * 10/1998 Ishii ........................ H02M 3/28
361/25
6,626,002 B1 * 9/2003 Notohara ................ H02P 27/08
318/801
(Continued)

FOREIGN PATENT DOCUMENTS

| JP | 6026049 B2 | 11/2016 |
| JP | 2018-182960 A | 11/2018 |
| WO | 2016/075996 A1 | 5/2016 |

OTHER PUBLICATIONS

Communication dated Apr. 19, 2022 from the Japanese Patent Office in Application No. 2020-188415.
(Continued)

*Primary Examiner* — Yusef A Ahmed
(74) *Attorney, Agent, or Firm* — Sughrue Mion, PLLC; Richard C. Turner

(57) ABSTRACT

An electrical power conversion apparatus is obtained in which its devices constituting a DC/DC converter are not required to be large-sized, and a DC capacitor connected between an AC/DC converter and the DC/DC converter can be small-sized. The electrical power conversion apparatus includes a DC capacitor connected between an AC/DC converter and a DC/DC converter, and a control circuit for controlling the AC/DC converter and the DC/DC converter, wherein the control circuit generates an output current instruction of the DC/DC converter by performing superposition of an alternating current instruction on a direct current instruction, and determines an amplitude of the alternating current instruction in accordance with temperature information obtained from a DC-capacitor's temperature acquisition means.

7 Claims, 9 Drawing Sheets

(51) Int. Cl.
  *H02M 1/32*    (2007.01)
  *H02M 1/42*    (2007.01)
  *H02M 7/48*    (2007.01)
  *H02M 7/219*   (2006.01)
  *H02M 5/458*   (2006.01)
  *H02M 7/537*   (2006.01)
  *H02M 7/5387*  (2007.01)

(52) U.S. Cl.
  CPC ....... *H02M 1/4233* (2013.01); *H02M 5/4585* (2013.01); *H02M 7/219* (2013.01); *H02M 7/48* (2013.01); *H02M 7/537* (2013.01); *H02M 7/5387* (2013.01)

(58) Field of Classification Search
  CPC ........ H02M 7/219; H02M 7/48; H02M 7/537; H02M 7/5387; H02M 1/0025; H02M 1/0085; H02M 1/15; H02M 1/007; Y02B 70/10
  See application file for complete search history.

(56) References Cited

U.S. PATENT DOCUMENTS

| | | | | |
|---|---|---|---|---|
| 7,796,410 | B2* | 9/2010 | Takayanagi | B60L 1/003 307/66 |
| 9,554,431 | B2* | 1/2017 | Garrity | H05B 45/39 |
| 2003/0053324 | A1* | 3/2003 | Yamamoto | H02M 1/4216 363/127 |
| 2008/0205089 | A1* | 8/2008 | Zhu | H02M 3/33592 363/20 |
| 2008/0284400 | A1* | 11/2008 | Oettinger | H02M 3/157 323/283 |
| 2009/0147553 | A1* | 6/2009 | Ryu | H02M 3/3374 363/65 |
| 2011/0134672 | A1* | 6/2011 | Sato | H02M 1/10 363/126 |
| 2011/0228573 | A1* | 9/2011 | Yoshida | H02M 1/4225 363/37 |
| 2012/0106218 | A1* | 5/2012 | Awane | H02M 3/335 363/127 |
| 2012/0256571 | A1* | 10/2012 | Ang | B60L 50/51 363/124 |
| 2012/0281441 | A1* | 11/2012 | Liu | H02M 7/48 363/35 |
| 2012/0320641 | A1* | 12/2012 | Chapman | H02J 3/44 363/37 |
| 2013/0033914 | A1* | 2/2013 | Yahata | H02M 7/48 363/132 |
| 2013/0058134 | A1* | 3/2013 | Yamada | H02M 7/217 363/16 |
| 2013/0088177 | A1* | 4/2013 | Niizuma | H02J 50/90 318/768 |
| 2013/0257301 | A1* | 10/2013 | Tran | H02M 1/36 315/200 R |
| 2013/0342139 | A1* | 12/2013 | Shimomugi | H02P 27/06 318/400.3 |
| 2014/0119085 | A1* | 5/2014 | Potharaju | H02J 3/381 363/132 |
| 2014/0153303 | A1* | 6/2014 | Potharaju | H02S 40/32 438/66 |
| 2014/0211530 | A1* | 7/2014 | Chen | H02M 7/48 363/132 |
| 2014/0233279 | A1* | 8/2014 | Kondo | H02M 5/4585 363/37 |
| 2015/0043253 | A1* | 2/2015 | Awane | H02M 5/4585 363/126 |
| 2015/0085533 | A1* | 3/2015 | Tanahashi | H02M 3/33584 363/17 |
| 2015/0280601 | A1* | 10/2015 | Sakakibara | H02M 1/15 363/37 |
| 2015/0372584 | A1* | 12/2015 | Hirota | H02M 3/33584 363/37 |
| 2016/0079888 | A1* | 3/2016 | Li | H02P 6/28 318/400.3 |
| 2016/0181944 | A1* | 6/2016 | James | H02J 3/38 363/127 |
| 2016/0233782 | A1* | 8/2016 | Sakakibara | H02M 1/4225 |
| 2016/0268890 | A1* | 9/2016 | Ayai | H02M 7/48 |
| 2016/0303987 | A1* | 10/2016 | Kawamura | H02M 3/3376 |
| 2017/0207763 | A1* | 7/2017 | Li | H02P 27/06 |
| 2017/0244317 | A1* | 8/2017 | Kondo | H02M 7/12 |
| 2017/0331395 | A1* | 11/2017 | Kanazawa | H02M 7/5395 |
| 2018/0041108 | A1* | 2/2018 | Tanaka | H02M 1/083 |
| 2018/0323700 | A1* | 11/2018 | Mizutani | H02M 3/33576 |
| 2019/0044469 | A1* | 2/2019 | Ito | H03K 17/161 |
| 2019/0149055 | A1* | 5/2019 | Tomita | H02M 3/3376 363/17 |
| 2019/0222135 | A1* | 7/2019 | Sakakibara | H02M 1/15 |
| 2019/0241088 | A1* | 8/2019 | Kimura | B60L 53/22 |
| 2019/0319548 | A1* | 10/2019 | Nakahara | H02M 7/10 |
| 2019/0341860 | A1* | 11/2019 | Fujiwara | H02M 7/12 |
| 2019/0348833 | A1* | 11/2019 | Sun | H02M 1/4233 |
| 2020/0106359 | A1* | 4/2020 | Sakakibara | H02M 3/158 |
| 2020/0180451 | A1* | 6/2020 | Kawamura | H02M 3/1584 |
| 2020/0403527 | A1* | 12/2020 | Kobayashi | H02M 1/32 |
| 2021/0135592 | A1* | 5/2021 | Tsuboka | H02M 7/125 |
| 2021/0313903 | A1* | 10/2021 | Sakakibara | H02M 1/4225 |
| 2022/0045595 | A1* | 2/2022 | Kobayashi | H02M 3/158 |
| 2022/0200480 | A1* | 6/2022 | Norisada | H02M 3/335 |
| 2022/0258593 | A1* | 8/2022 | Kadota | H02M 3/33573 |

OTHER PUBLICATIONS

Notice of Reasons for Refusal dated Nov. 24, 2021 from the Japanese Patent Office in Japanese Application No. 2020-188415.

* cited by examiner

ELECTRICAL POWER CONVERSION APPARATUS

BACKGROUND OF THE INVENTION

Field of the Invention

The disclosure of the present application relates to an electrical power conversion apparatus in which an AC/DC converter and a DC/DC converter are connected to each other intermediately by way of a DC capacitor.

Description of the Related Art

In a conventional electrical power conversion apparatus in which an AC/DC converter and a DC/DC converter are connected in series to each other, an AC power supply or source is rectified by a rectifier circuit portion, and a DC voltage inputted into a high power-factor converter circuit portion is boosted and outputted therefrom. The high power-factor converter circuit portion enhances a power factor of the AC/DC converter by controlling a ratio of time to turn on/turn off switching transistors in the shape of a sinusoidal wave, and, in addition, controls the DC voltage. A boosted DC voltage is stabilized by a DC capacitor, so that a DC/DC converter portion converts a DC voltage supplied from the DC capacitor thereto into a desired DC voltage, and drives a load thereby.

When the capacitance of a DC capacitor is reduced in its magnitude, a ripple voltage of a DC busbar voltage varying at a two-fold frequency of a power supply or source frequency increases in particular when a commercial AC power source is in a single phase. When a ripple voltage on the DC busbar voltage increases, a withstand voltage of the DC capacitor is exceeded at an upper limit of the ripple, and, when a voltage of a commercial AC power source falls below at a lower limit of the ripple, an inrush current flows into from the commercial AC power source, so that a power factor may result in degradation. In order to suppress a ripple voltage on the DC busbar voltage, an alternating current instruction taking on a minimum value at a zero-crossing phase of the commercial AC power source and taking on a maximum value at a peak phase thereof is determined so as to suppress a ripple current of the DC capacitor, and, by performing superposition of the alternating current instruction on a direct current instruction, an output current instruction of a DC/DC converter is generated, so that an output control is performed on the DC/DC converter by using the output current instruction (for example, refer to Patent Document 1).

[Patent Document 1] Japanese Patent Publication No. 6026049

In an electrical power conversion apparatus in Patent Document 1, an output control is carried out by performing superposition of an alternating current instruction on a direct current instruction of a DC/DC converter, and so, an electric current ripple having a two-fold frequency of a power source frequency is caused in a DC output current of the DC/DC converter. For this reason, root-mean-square values of electric currents flowing through switching devices and a reactor(s) each of which is a device constituting the DC/DC converter increase, which results in the increase of their losses, so that it has been necessary to make their structural size or body large in order to achieve their thermal equilibrium. Because, in a case of the application of an isolated-type DC/DC converter, its insulating transformer also contributes to the increase of losses, it is necessary to make the structural body large, which interferes with miniaturization of an electrical power conversion apparatus and with lower costs thereof. In addition, in the reactor(s), a required direct current superposition characteristic increases in accordance with the increase of an electric current flowing through the reactor(s), and so, in particular for use in the reactor(s) utilizing a core(s) of ferrite or the like for its core(s) in which a direct current superposition characteristic is sharply reduced, so that, in order to secure the direct current superposition characteristic, there arises the necessity to make the core(s) in large size, which interferes with miniaturization of such an electrical power conversion apparatus and with lower costs thereof.

SUMMARY OF THE INVENTION

The present disclosure of the application concerned has been directed at solving those problems described above, and an object of the present disclosure is to obtain an electrical power conversion apparatus whose devices constituting its DC/DC converter are not required to be made in large size, and its DC capacitor can be made in small size.

An electrical power conversion apparatus disclosed in the present disclosure of the application concerned comprises: an AC/DC converter for converting AC power from an AC power source into DC power; a DC/DC converter, being connected on a DC side of the AC/DC converter, for performing voltage conversion of DC power thereon; a DC capacitor, being connected between the AC/DC converter and the DC/DC converter, for smoothing electric power therebetween; and a control circuit for controlling the AC/DC converter and the DC/DC converter, wherein the control circuit generates an output current instruction of the DC/DC converter by performing superposition of an alternating current instruction, taking on a minimum value at a zero-crossing phase of the AC power source and taking on a maximum value at a peak phase thereof, on a direct current instruction, and performs an output control on the DC/DC converter by using the output current instruction; and the electrical power conversion apparatus further comprises a DC-capacitor's temperature acquisition means for acquiring ambient temperature of the DC capacitor, wherein the control circuit determines an amplitude of the alternating current instruction in accordance with temperature information obtained from the DC-capacitor's temperature acquisition means.

According to the electrical power conversion apparatus disclosed in the present disclosure of the application concerned, an electrical power conversion apparatus has a DC-capacitor for smoothing electric power between an AC/DC converter and a DC/DC converter, and carries out the control on the DC/DC converter by performing superposition of an alternating current instruction on a direct current instruction; and, in the electrical power conversion apparatus, the alternating current instruction is changed in accordance with a temperature of the DC-capacitor, whereby semiconductor switching devices constituting the DC/DC converter are not required to be made in large size, and the DC-capacitor can be made in small size. According to this arrangement, it is possible to implement miniaturization of the electrical power conversion apparatus, and lower prices thereof.

DETAILED DESCRIPTION OF THE PREFERRED EMBODIMENTS

Embodiment 1

Hereinafter, the explanation will be made for Embodiment 1.

Figure 1:
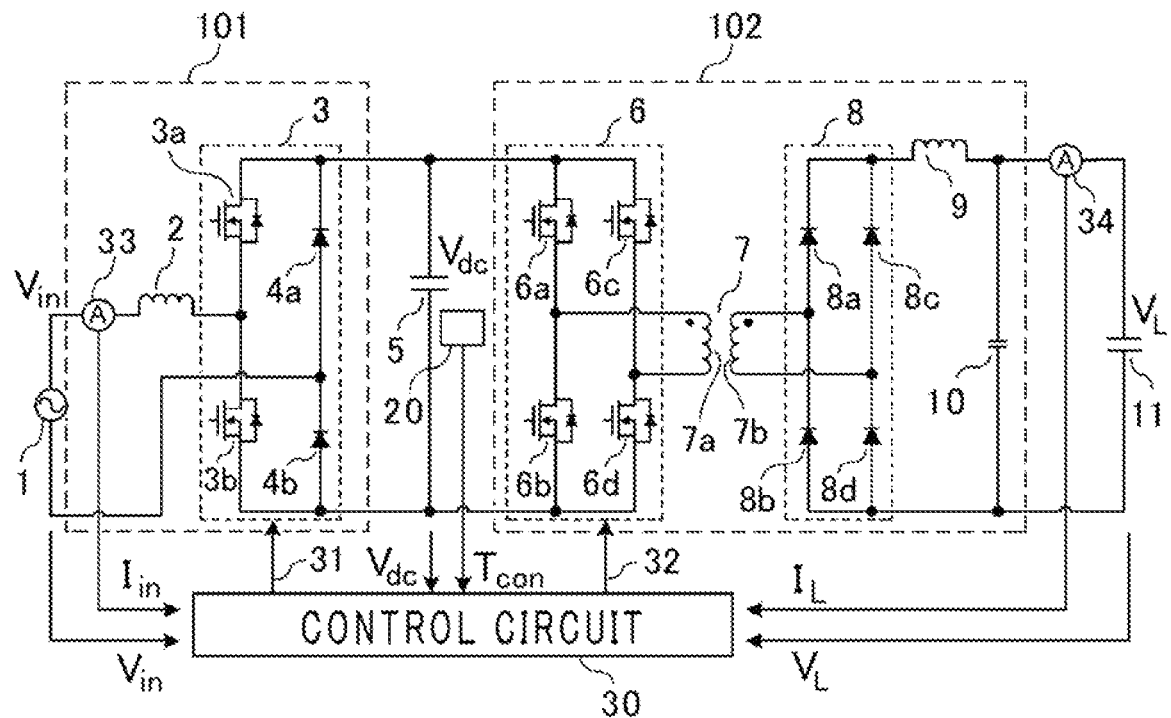
FIG. 1 is diagram illustrating a configuration of an electrical power conversion apparatus according to Embodiment 1.

FIG. 1 is diagram illustrating a circuit configuration of an electrical power conversion apparatus according to Embodiment 1. As illustrated in FIG. 1, the electrical power conversion apparatus converts an AC voltage Vin of a single-phase AC power supply or source 1 to a primary-side DC voltage Vdc, and further converts the primary-side DC voltage Vdc to a secondary-side DC voltage insulated by a transformer 7, so that the electrical power conversion apparatus outputs a DC voltage VL into a load 11 such as a battery, for example, or the like.

The electrical power conversion apparatus includes: an AC/DC converter 101, by defining the AC power source 1 as its input, for converting an AC voltage Vin to a primary-side DC voltage Vdc; a DC capacitor 5 for smoothing an output of the AC/DC converter 101; and a DC/DC converter 102, by defining the DC capacitor 5 as its input, for converting the primary-side DC voltage Vdc to the DC voltage VL into the load 11.

The AC/DC converter 101 includes: a PFC (Power Factor Collection) reactor 2 for use in power-factor enhancement; and a rectifier circuit 3 in which semiconductor switching devices 3a and 3b made of MOSFETs (Metal Oxide Semiconductor Field Effect Transistors), in each of which a diode is built in between the transistor's source and drain, form a half-bridge configuration, and in which, in parallel with the half-bridge to configure totem-pole type circuitry, a series-connected circuit is formed by connecting diodes 4a and 4b in series to each other, whereby the rectifier circuit rectifies an AC voltage Vin of the AC power source 1 into a DC voltage Vdc of the DC capacitor 5.

The DC/DC converter 102 includes: the isolating transformer (insulating transformer) 7; a single-phase inverter 6 being connected to a primary winding 7a of the transformer 7 in which semiconductor switching devices 6a to 6d made of MOSFETs, in each of which a diode is built in between the transistor's source and drain, form a full-bridge configuration for converting a DC voltage Vdc of the DC capacitor 5 to an AC voltage as an inverter; and a rectifier circuit 8 being connected to a secondary winding 7b of the transformer 7 in which diodes 8a to 8d form a full-bridge configuration as rectifier devices (semiconductor devices). In addition, to an output of the rectifier circuit 8, a reactor 9 for use in smoothing the output, and an output capacitor 10 are connected, and a DC voltage VL is outputted into the load 11.

Moreover, on the periphery of those main circuits, a control circuit 30 is placed, and those input voltage Vin and output voltage VL are individually monitored and inputted into the control circuit 30. In addition, an input current Iin is monitored by an electric current sensor 33, and an output current IL is monitored by an output current sensor 34, so that these currents are individually inputted into the control circuit 30. The control circuit 30 outputs gate signals 31 into the semiconductor switching devices 3a and 3b, so that their DC voltage Vdc becomes a target voltage, and also that the input current achieves a high power factor; and thus, the control circuit controls turn-on duties (turn-on time-periods each) of the semiconductor switching devices 3a and 3b. In addition, the control circuit outputs gate signals 32 into the semiconductor switching devices 6a to 6d so that the output current IL becomes a target current, and thus controls turn-on duties (turn-on time-periods each) of the semiconductor switching devices 6a to 6d.

Furthermore, an ambient temperature Tcon of the DC capacitor 5 is acquired by means of a DC-capacitor's temperature acquisition means 20, for example, using a thermistor, and is inputted into the control circuit 30. The control circuit 30 determines a target current value of the output current in accordance with the ambient temperature Tcon of the DC capacitor 5.

Note that, the semiconductor switching devices 3a and 3b, and those 6a to 6d are not necessarily limited to MOSFETs; and so, it may also be suitable for them to use self-extinction-type semiconductor switching devices such as IGBTs (Insulated Gate Bipolar Transistors) or the like in each of which a diode is connected in antiparallel with the device to each other.

Figure 2:
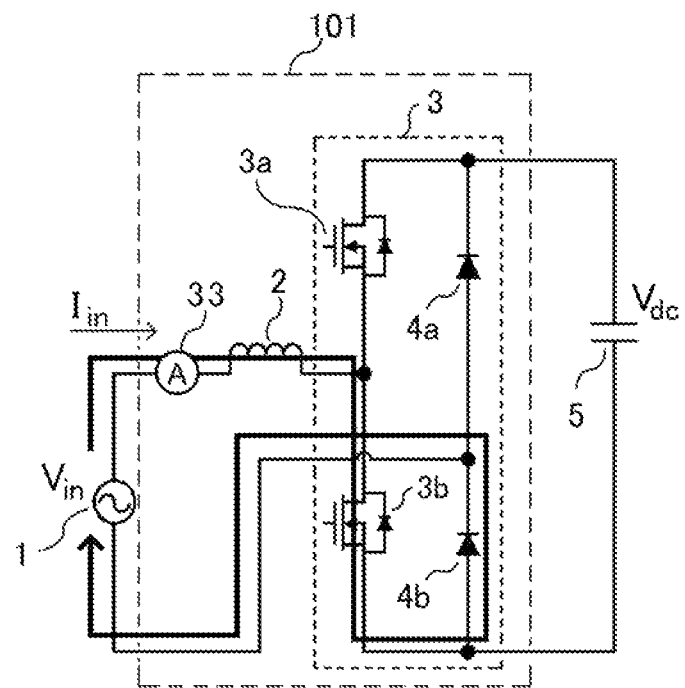
FIG. 2 is a diagram illustrating an electric current path indicating the operations of an AC/DC converter of the electrical power conversion apparatus according to Embodiment 1.
Figure 3:
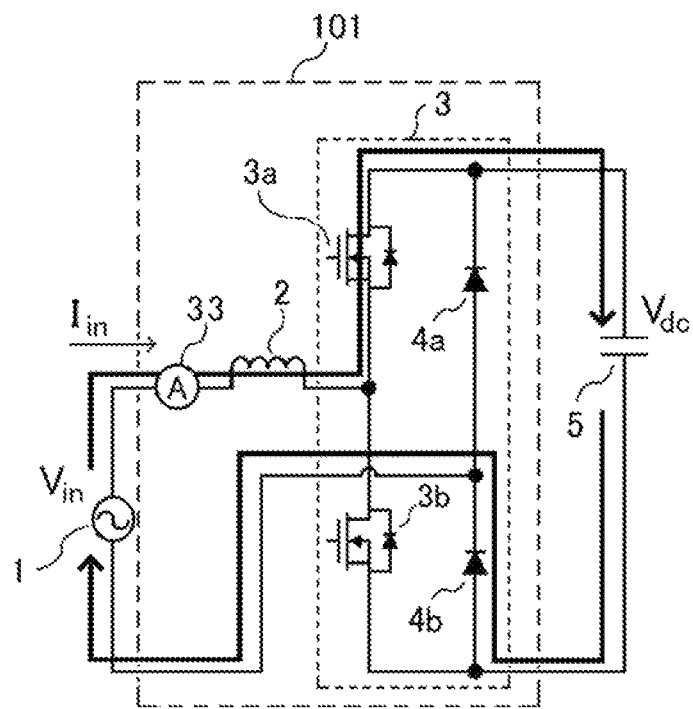
FIG. 3 is a diagram illustrating electric current paths indicating the operations of the AC/DC converter of the electrical power conversion apparatus according to Embodiment 1.
Figure 4:
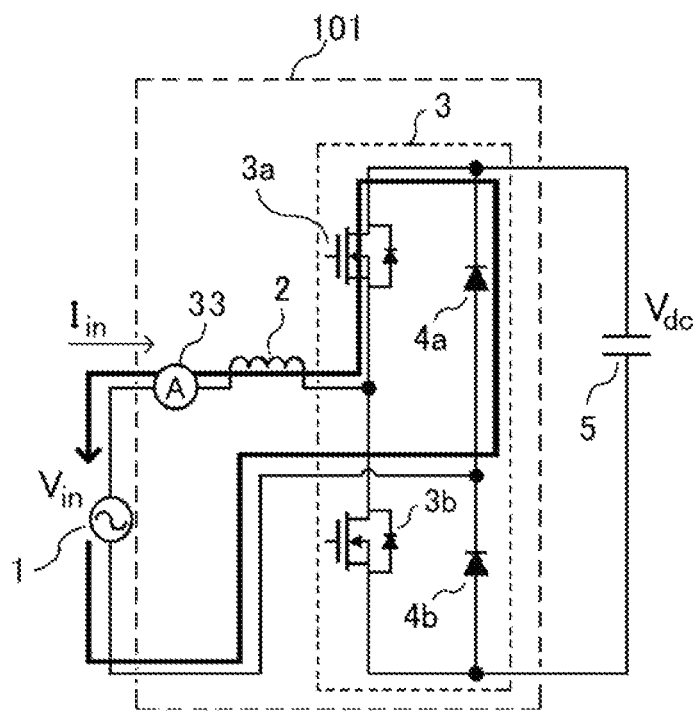
FIG. 4 is a diagram illustrating an electric current path indicating the operations of the AC/DC converter of the electrical power conversion apparatus according to Embodiment 1.
Figure 5:
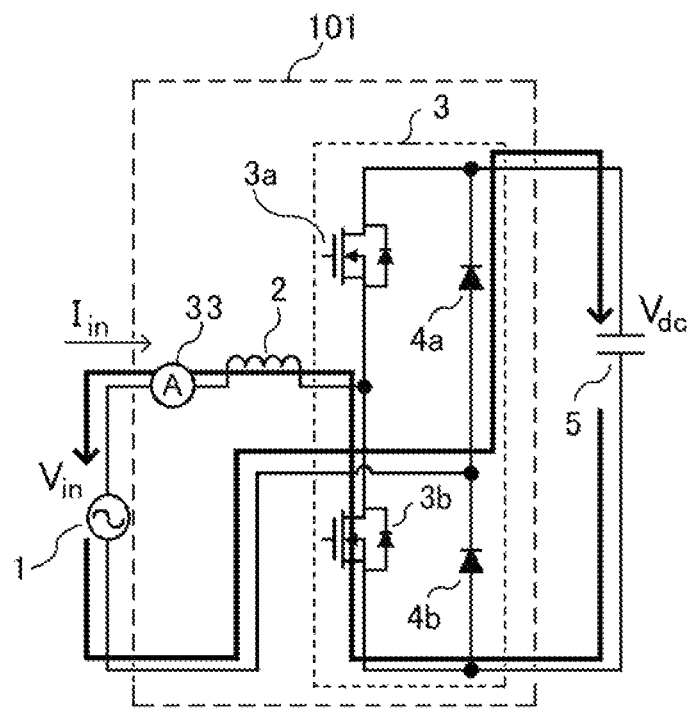
FIG. 5 is a diagram illustrating electric current paths indicating the operations of the AC/DC converter of the electrical power conversion apparatus according to Embodiment 1.

The explanation will be made for the operations of the electrical power conversion apparatus configured as described above, as follows. FIG. 2 through FIG. 5 are diagrams each illustrating an electric current path(s) for explaining the operations of the AC/DC converter 101. When an AC voltage Vin is a positive voltage, an input current is short-circuited by way of the reactor 2 when the semiconductor switching device 3b turns on, so that the reactor 2 is excited and its electric current increases in positive polarity (FIG. 2). And then, when the semiconductor switching device 3b turns off, exciting energy stored in the reactor 2 is outputted on the side toward the DC capacitor 5 by way of the semiconductor switching device 3a. At this time, an electric current of the reactor 2 is reduced (FIG. 3). When the AC voltage Vin is a negative voltage, the input current is short-circuited by way of the reactor 2 when the semiconductor switching device 3a turns on, so that the reactor 2 is excited and its electric current increases in negative polarity (FIG. 4). And then, when the semiconductor switching device 3a turns off, exciting energy stored in the reactor 2 is outputted on the side toward the DC capacitor 5 by way of the diode 4a. At this time, the electric current of the reactor 2 is reduced (FIG. 5).

The control circuit 30 performs the control on an alternating current iac being inputted at a high power factor by performing the turn-on/turn-off control on the semiconductor switching devices 3a and 3b as described above. Note that, the semiconductor switching device 3a and the semiconductor switching device 3b are ideally driven at similar duty ratios to each other. Here, a theoretical duty ratio D3a of the semiconductor switching device 3a in a case in which the electric current iac is controlled at a high power factor (in an example where the input voltage Vin is positive) is given by Equation (1) as follows. At this time, a duty ratio D3b of the semiconductor switching device 3b can be expressed by Equation (2) based on Equation (1). Where, a voltage vac of the AC power source 1 is defined by Equation (3). Therefore, an electric current iin flowing into the DC capacitor 5 can be given by Equation (4).

Note that, it is presumed that a loss(es) is not caused in between from the AC power source 1 until the DC capacitor 5. In addition, in the duties of D3a and D3b, dead-time intervals are provided in which the semiconductor switching devices 3a and 3b are both turned off in order not to introduce an arm short-circuit(s). Moreover, at a duty ratio of D3a, the semiconductor switching device 3b may be turned on.

$$D3a = (Vdc - vac)/Vdc \quad (1)$$

$$D3b = vac/Vdc \quad (2)$$

$$vac = (\sqrt{2})Vac \cdot \sin\omega t \quad (3)$$

$$iin = (vac/Vdc)iac = (2Vac \cdot Iac/Vdc)\sin2\omega t \quad (4)$$

Figure 6:
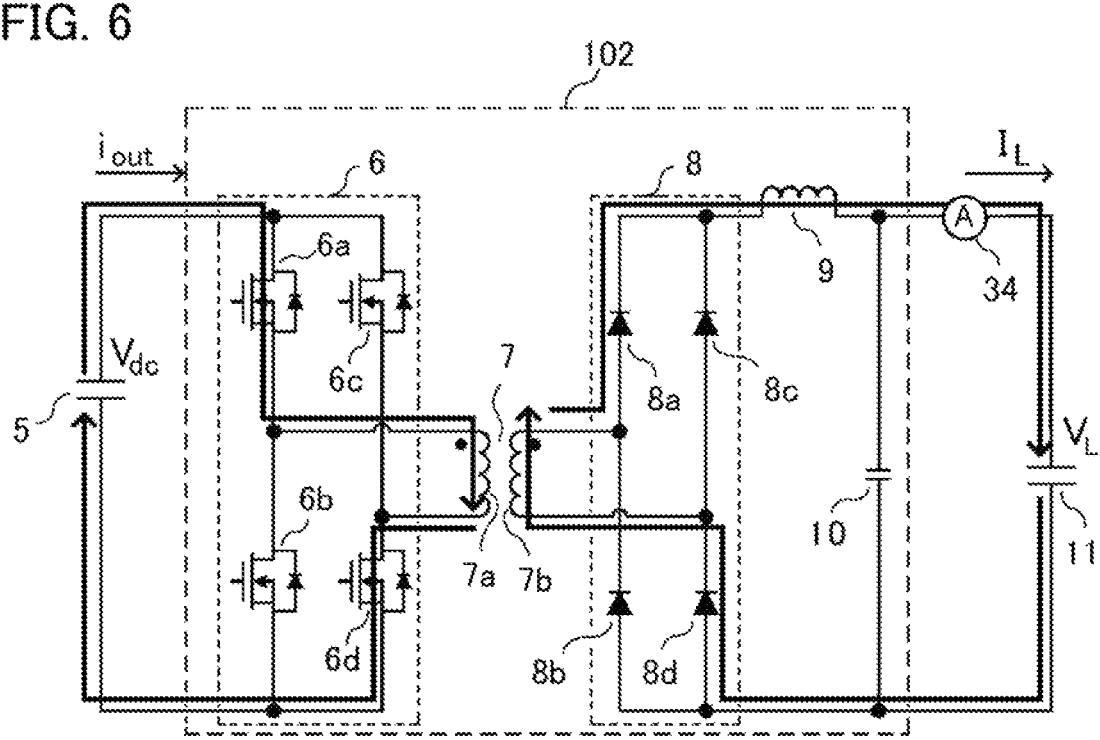
FIG. 6 is a diagram illustrating electric current paths indicating the operations of a DC/DC converter of the electrical power conversion apparatus according to Embodiment 1.
Figure 7:
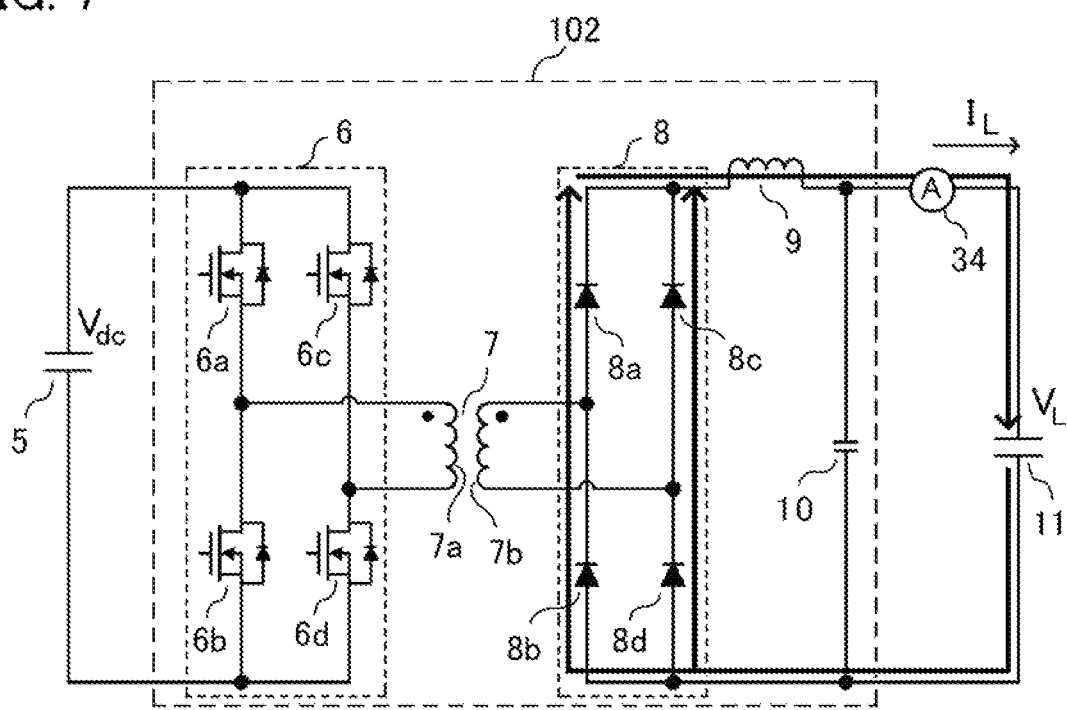
FIG. 7 is a diagram illustrating electric current paths indicating the operations of the DC/DC converter of the electrical power conversion apparatus according to Embodiment 1.

Next, the explanation will be made for the operations of the DC/DC converter 102. The DC/DC converter 102 is an example of an isolated-type full-bridge converter circuit. The control circuit 30 performs turn-on/turn-off controls on the semiconductor switching devices 6a to 6d so that DC power of the DC capacitor 5 is outputted therefrom, and controls an electric current IL into the load 11 and a voltage VL thereacross at their desired values. FIG. 6 and FIG. 7 are diagrams each illustrating electric current paths for explaining the operations of the DC/DC converter 102. In time-periods in which the semiconductor switching devices 6a and 6d turn on, and the semiconductor switching devices 6b and 6c turn off, an electric current flows from the DC capacitor 5 through the semiconductor switching device 6a, the primary-side winding 7a of the transformer 7, and the semiconductor switching device 6d. At the same time on the secondary side, an electric current flows through the secondary-side winding 7b of the transformer 7, the diode 8a, the reactor 9, the load 11 and the diode 8d (FIG. 6). Next, the semiconductor switching devices 6a to 6d turn off, so that no electric current flows on the primary side; meanwhile, on the secondary side, an electric current flows through the diode 8a and the diode 8b, the reactor 9 and the load 11, or through the diode 8c and the diode 8d, the reactor 9 and the load 11 (FIG. 7). In subsequence, similarly to the time-periods in which the semiconductor switching devices 6a and 6d turn on, and the semiconductor switching devices 6b and 6c turn off, there arise time-periods in which the semiconductor switching devices 6b and 6c turn on, and the semiconductor switching devices 6a and 6d turn off; and, after having passed those time-periods, the semiconductor switching devices 6a to 6d turn off. It should be noted that, the same time-spans are applied to the time-periods in which the semiconductor switching devices 6a and 6d turn on, and the semiconductor switching devices 6b and 6c turn off, and to the time-periods in which the semiconductor switching devices 6b and 6c turn on, and the semiconductor switching devices 6a and 6d turn off.

In the DC/DC converter 102 which operates as described above, the control circuit 30 adjusts duty ratios between time-periods in which the semiconductor switching devices 6a and 6d turn on (or, the semiconductor switching devices 6b and 6c turn on) and time-periods in which the semiconductor switching devices 6a to 6d turn off, whereby electric power supplied into the load 11, i.e., a load current IL in this case is adjusted. And then, the DC/DC converter 102 supplies DC power into the load 11 by supplying a DC voltage VL to the load 11 as the electric current IL. Although an output current iout outputted from the DC capacitor 5 is discontinuous with respect to switching periods of the semiconductor switching devices 6a to 6d, it is possible to determine that the output current is an electric current which is on average continuous with respect to the period of the AC power source 1. It is assumed that the output current iout of the DC capacitor 5 is presumably a direct current idc. In this case, a relational expression of a voltage of the DC capacitor 5 can be expressed by Equation (5) as follows. Where, the capacitance of the DC capacitor 5 is defined as "Cdc," and an AC voltage component (ripple voltage) of the DC capacitor 5, as "vc2." By presuming that an alternating current iac being inputted is controlled at a high power factor, Equation (6) can be given. By solving Equation (5) for the AC voltage component (ripple voltage) vc2 of the DC capacitor 5, Equation (7) can be derived.

$$Cdc(dvc2/dt) = iin - idc = (2Vac \cdot Iac/Vdc)\sin 2\omega t - idc \qquad (5)$$

$$iac = (\sqrt{2})Iac \cdot \sin \omega t \qquad (6)$$

$$vc2 = (2Vac \cdot Iac/2\omega Cdc \cdot Vdc)\sin(2\omega t) \qquad (7)$$

Figure 8:
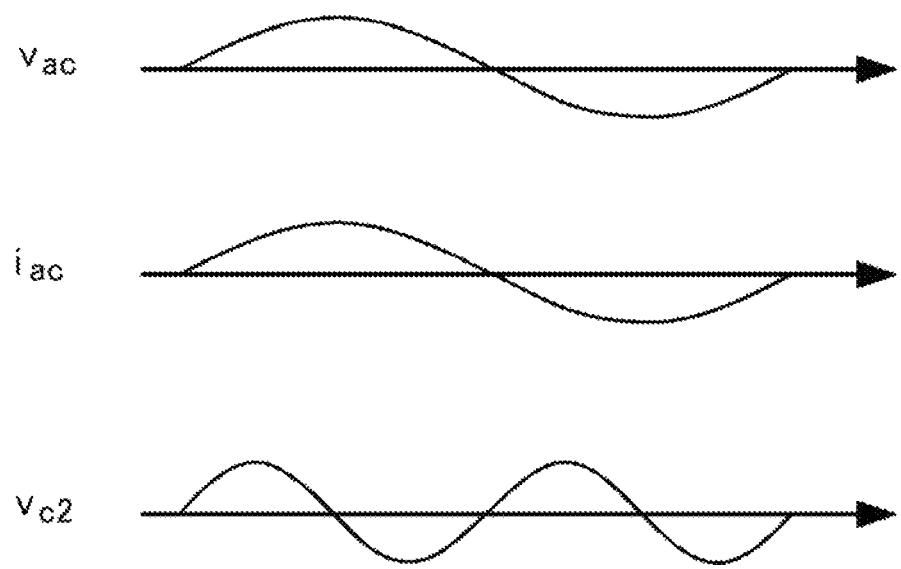
FIG. 8 is a diagram showing voltage and electric current waveforms of an AC power source, and a ripple voltage waveform of a DC capacitor according to a reference example of Embodiment 1.

Equation (7) indicates that, when an output current iout outputted from the DC capacitor 5 is presumably a direct current, a ripple voltage vc2 of a two-fold frequency of the AC power source 1 is inevitably caused on the DC capacitor 5 due to a high power-factor control which is performed thereon by the AC/DC converter 101 connected to the AC power source 1. A diagram of waveforms of such a ripple voltage vc2, and a voltage vac of the AC power source 1 and an electric current iac thereof is together shown in FIG. 8 as a reference example of this embodiment. As shown in FIG. 8, the ripple voltage vc2 varies to a large extent at a two-fold frequency of the AC power source 1.

In this embodiment, in order to achieve to suppress the ripple voltage vc2 caused on the DC capacitor 5, the control circuit 30 intentionally performs superposition of an alternating current component (ripple current) irp on the output current iout of the DC capacitor 5. To be specific, by controlling the DC/DC converter 102 so that an alternating current component (ripple current) is produced in an electric current IL being outputted into the load 11, the ripple current irp is produced in an output current iout of the DC capacitor 5.

Figure 9:
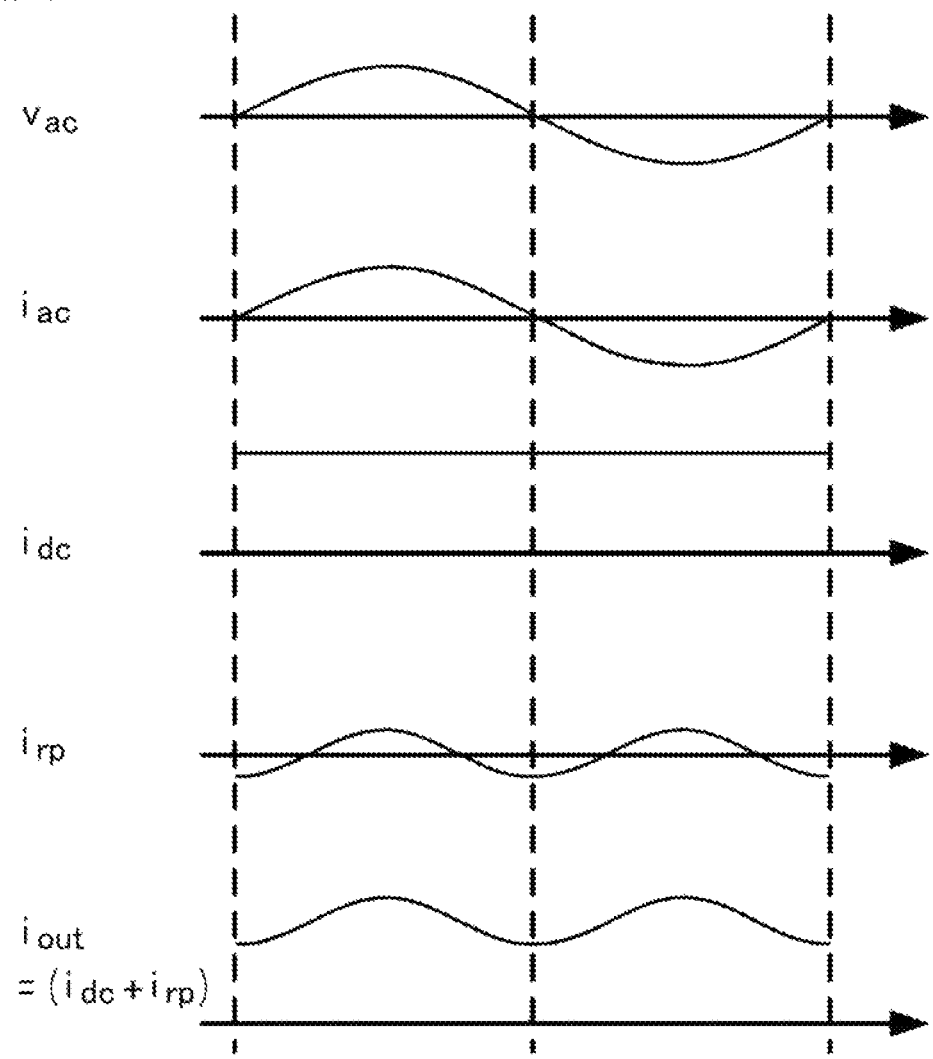
FIG. 9 is a diagram showing a waveform of each of the components included in an output current of a DC capacitor according to Embodiment 1.

FIG. 9 is a diagram showing a waveform of a voltage vac of the AC power source 1 and that of an electric current iac thereof, and a waveform of each of the components included in an output current iout of the DC capacitor 5. The output current iout of the DC capacitor 5 is an electric current in which superposition of a ripple current irp is performed on a direct current component idc, and so, the ripple current irp being superimposed is determined to be a sinusoidal wave current having a two-fold frequency of the voltage vac of the AC power source 1. And in addition, an initial phase is set so that the ripple current irp takes on its minimum value at a zero-crossing phase of the AC power source 1 and then takes on its maximum value at a peak phase thereof. When the voltage vac of the AC power source 1 shown in FIG. 9 is given by Equation (3) described above, and an alternating current iac controlled at a power factor of 1 is defined as given by Equation (6) described above, a ripple current irp of the DC capacitor 5 can be expressed by Equation (8) as follows, and an output current iout, by Equation (9) as follows. Where, a root-mean-square value of the ripple current irp is defined as "Irp."

$$irp = -(\sqrt{2})Irp \cdot \cos(2\omega t) \qquad (8)$$

$$iout = idc - (\sqrt{2})Irp \cdot \cos(2\omega t) \qquad (9)$$

Figure 10:
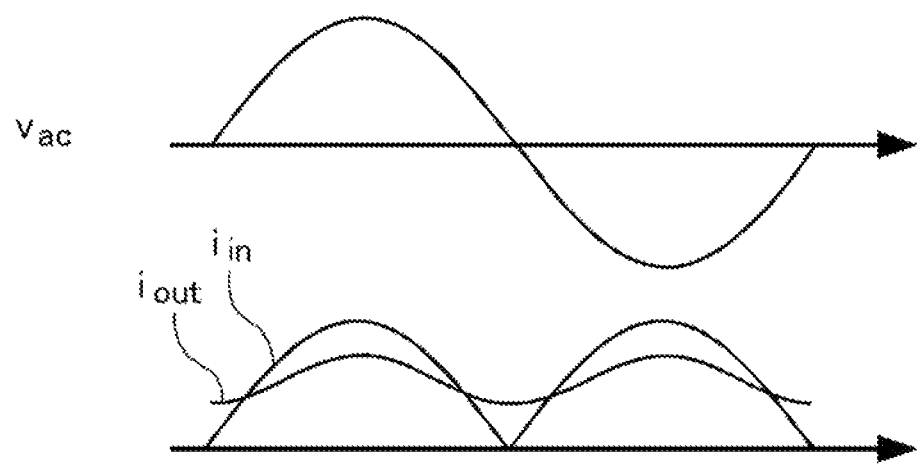
FIG. 10 is a diagram showing waveforms of input and output currents of the DC capacitor according to Embodiment 1.

FIG. 10 is a diagram showing waveforms of input and output currents of the DC capacitor 5 according to this embodiment. As shown in FIG. 10, at a zero-crossing phase of the AC power source 1, an output current iout takes on a minimum value in coincidence with the timing when an input current iin of the DC capacitor 5 takes on approximately zero. In addition, at a peak phase of the AC power source, the output current iout takes on a maximum value in coincidence with the timing when the input current iin takes on a maximum value. According to this arrangement, it is possible to suppress a charge-discharge electric-current (iin-iout) being a ripple current in which the DC capacitor 5 compensates, and possible to suppress a ripple voltage vc2 of the DC capacitor 5 and a root-mean-square value of its ripple current.

Because the DC capacitor 5 outputs an output current iout given by Equation (9) described above, a relational expression of a voltage of the DC capacitor 5 can be expressed by Equation (10) as follows. By solving Equation (10) for a ripple voltage vc2 of the DC capacitor 5, Equation (11) can be derived.

$$Cdc(dvc2/dt) = \qquad (10)$$

$$iin - iout = (2Vac \cdot Iac/Vdc)\sin 2\omega t - (idc - (\sqrt{2})Irp \cdot \cos(2\omega t))$$

$$vc2 = ((Vac \cdot Iac - Vdc \cdot (\sqrt{2})Irp)/2\omega Cdc \cdot Vdc) \cdot \sin(2\omega t) \qquad (11)$$

As expressed by Equation (11) described above, a ripple voltage vc2 produced on the DC capacitor 5 is reduced, in accordance with the increase of a peak value ($\sqrt{2}$)Irp of the ripple current irp where superposition is performed on an output current iout of the DC capacitor 5. Based on Equation (11) described above, an amplitude ΔVdc of the ripple voltage vc2, being an AC voltage component of the DC capacitor 5, is defined by Equation (12) as follows.

$$\Delta Vdc = ((Vac \cdot Iac - Vdc \cdot (\sqrt{2})Irp)/2\omega Cdc \cdot Vdc) \qquad (12)$$

In addition, an input current iin flowing into the DC capacitor 5 can be expressed by Equation (13) as follows. Because an output current iout flowing out from the DC capacitor 5 can be given by Equation (9) described above, a charge-discharge electric-current (iin-iout) of the DC capacitor 5 can be given by Equation (14) as follows. Moreover, Equation (13) and Equation (14) can be expressed by Equation (13a) and Equation (14a) by using a load voltage VL and a load current IL, respectively. Where, an instruction value of the load current IL is defined as a value IL*, and a root-mean-square value of a ripple current produced in the load current IL, defined as a value ILrp.

$$iin = (Vac \cdot Iac/Vdc) \cdot (1 + \cos(2\omega t - \pi)) \qquad (13)$$

$$= (VL \cdot IL/Vdc) \cdot (1 + \cos(2\omega t - \pi)) \qquad (13a)$$

$$iin - iout = (idc - (\sqrt{2})Irp) \cdot \cos(2\omega t - \pi) \qquad (14)$$

$$= (VL/Vdc) \cdot (IL* - (\sqrt{2})ILrp) \cdot \cos(2\omega t - \pi) \qquad (14a)$$

As expressed by Equation (14a) described above, it can be understood that a charge-discharge electric-current (iin-iout) of the DC capacitor 5 becomes a two-fold frequency component of a voltage vac of the AC power source 1. In addition, the charge-discharge electric-current (iin-iout) is reduced, in accordance with the increase of a peak value ($\sqrt{2}$)Irp of the ripple current irp where superposition is performed on an output current iout, or with the increase of a ripple-current peak value ($\sqrt{2}$)ILrp produced in a load current IL. Based on Equation (14a) described above, an amplitude ΔIrp of the charge-discharge electric-current (iiniout) of the DC capacitor 5 is defined by Equation (15) as follows.

$$\Delta Irp = (VL/Vdc) \cdot (IL^* - (\sqrt{2})ILrp) \quad (15)$$

By the way, an electric current component of a carrier frequency of the AC/DC converter 101 and that of a carrier frequency of the DC/DC converter 102 flow into the DC capacitor 5, and flow out of it. A charge-discharge electric-current of the DC capacitor 5 is defined by not only the component expressed by Equation (14a), but also by a total sum of those components of a carrier frequency or the like, and that of another frequency component(s) under actual circumstances. In particular, a carrier frequency is predominant and significantly high in comparison with a power source frequency of the AC power source 1, and electric current components of the carrier frequency which flow into the DC capacitor 5 and flow out of it are constant without depending on a two-fold frequency component of the AC power source 1. Namely, in a charge-discharge electric-current of the DC capacitor 5, an electric current component expressed by Equation (14a) varies in itself; however, electric current components of the carrier frequency are constant. For this reason, in this embodiment, the suppression is achieved on the electric current component expressed by Equation (14a), and so, the ripple current converges on itself in electric current components of the carrier frequency.

As described above, the DC capacitor 5 outputs a ripple current irp expressed by Equation (8) described above, whereby a ripple voltage vc2 caused on the DC capacitor 5 can be suppressed based on Equation (11) described above, and a charge-discharge electric-current (iin-iout) in which the DC capacitor 5 compensates can be suppressed based on Equation (14a) described above. A ripple current irp where the DC capacitor 5 outputs is in the shape of a sinusoidal wave having a two-fold frequency of a voltage vac of the AC power source 1, and is a ripple current whose initial phase is set so that its minimum value is taken on at a zero-crossing phase of the AC power source and its maximum value is taken on at a peak phase thereof; and thus, it is so configured that the ripple current is outputted into the DC/DC converter 102 from the DC capacitor 5.

Figure 11:
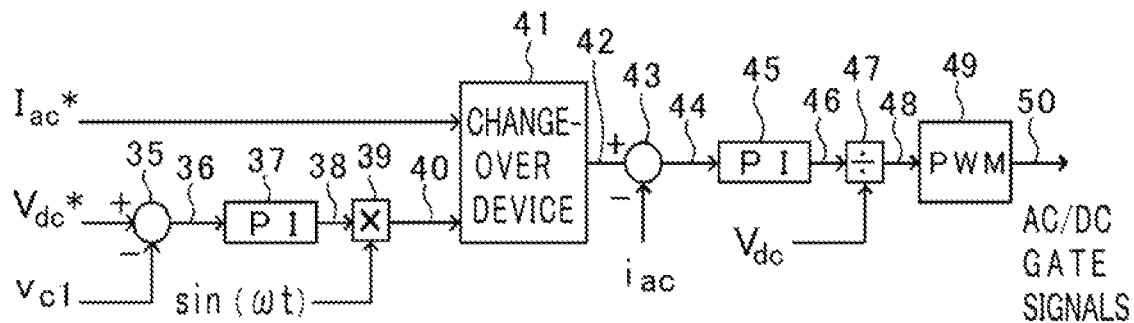
FIG. 11 is a control block diagram illustrating a configuration for generating gate signals of the AC/DC converter according to Embodiment 1.

Next, the explanation will be made for the controls of the AC/DC converter 101 and the DC/DC converter 102 by means of the control circuit 30. FIG. 11 is a control block diagram in the control circuit 30 illustrating the generation of gate signals for the AC/DC converter 101. The control circuit 30 controls, in the control of the AC/DC converter 101, an electric current iac being inputted from the AC power source 1 at a power factor of 1 with respect to a voltage vac of the AC power source 1. Moreover, the voltage control of the DC capacitor 5 is selectively performed. When the control circuit 30 performs a constant voltage control in which a voltage vc1 of the DC capacitor 5 is controlled at constant, an electric current instruction amplitude 38 is calculated by performing a PI control by means of a PI controller 37 on the deviation 36 between a DC voltage instruction value Vdc* and a voltage vc1 being detected where the deviation has been obtained by both of them through an addition-subtraction calculator 35. And then, an electric current instruction 40 is calculated by means of a multiplier 39 by multiplying the electric current instruction amplitude 38 by a sinusoidal wave signal sin ωt in the same phase with a voltage vac of the AC power source 1.

Meanwhile, in the control of the AC/DC converter 101, an electric current instruction Iac* is prepared for a case in which the control circuit 30 does not perform the constant voltage control on a voltage vc1 of the DC capacitor 5, but does perform only a high power-factor control on an electric current iac. In a changeover device 41, either one of the electric current instruction 40 and the electric current instruction Iac* is selected as an electric current instruction 42 in accordance with the presence or absence of performing the constant voltage control of the DC capacitor 5. Subsequently, a voltage instruction value 46 is calculated by means of a PI controller 45 by performing a PI control on the deviation 44 between the electric current instruction 42 and an electric current iac being detected where the deviation has been obtained by both of them through an addition-subtraction calculator 43; and then, a duty ratio 48 is calculated by dividing the voltage instruction value 46 by a DC voltage component Vdc of the DC capacitor 5 by means of a divider 47. And in subsequence, in a PWM circuit 49, gate signals 50 for the PWM control of the AC/DC converter 101 are generated based on the duty ratio 48. In the PWM circuit 49, a carrier frequency can be arbitrarily adjusted, and also, triangular waves, sawtooth waves or the like are used for carrier waves.

Figure 12:
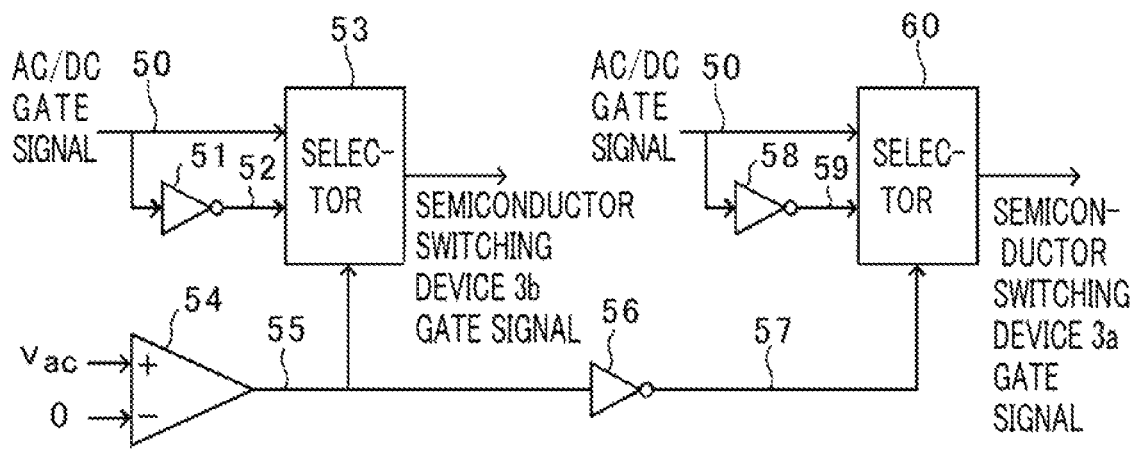
FIG. 12 is a control block diagram illustrating a configuration for generating gate signals of the AC/DC converter according to Embodiment 1.

FIG. 12 is a control block diagram in the control circuit 30 illustrating the generation of gate signals into each of the semiconductor switching devices 3a and 3b within the AC/DC converter 101. The gate signals 50 are individually inputted into a selector 53 in use for the semiconductor switching device 3b, and into a selector 60 in use for the semiconductor switching device 3a. A polarity determinator 54 distinguishes the polarity of a voltage vac of the AC power source 1, and outputs a signal 55 with a value "1" when the voltage vac is positive, and with a value "0" when the voltage is negative. In the selector 53, a gate signal 50 is selected when a voltage vac is positive based on the signal 55 from the polarity determinator 54, or a signal 52 in which the gate signal 50 is reversed in its polarity by a polarity inverter 51 is selected when the voltage vac is negative based thereon, so that a gate signal of the semiconductor switching device 3b is determined. In addition, in the selector 60, either a gate signal 50, or a signal 59 in which the gate signal 50 is reversed in its polarity by a polarity inverter 58 is selected based on a signal 57 in which the signal 55 is reversed by a polarity inverter 56. Namely, a gate signal 50 is selected when a voltage vac is negative, or a signal 59 in which the gate signal 50 is reversed in its polarity by the polarity inverter 58 is selected when the voltage vac is positive, so that a gate signal of the semiconductor switching device 3a is determined. Note that, for the gate signals of the semiconductor switching devices 3a and 3b, dead-time intervals may be provided in which the semiconductor switching devices 3a and 3b are both turned off in order not to introduce an arm short-circuit(s). Moreover, the semiconductor switching device 3a may be fixed on a turn off when a voltage vac is positive, and the semiconductor switching device 3b may be fixed on a turn off when the voltage vac is negative.

According to the above, the control circuit 30 obeys the controls shown in FIG. 11, and performs a high power-factor control on an electric current iac; and also, the control circuit generates a duty ratio 48 for performing a constant voltage control of the DC capacitor 5 on an as-needed basis, so that the gate signals 50 into the AC/DC converter 101 are generated. And then, the control circuit 30 obeys the controls shown in FIG. 12, so that the control circuit controls the gate signals of the semiconductor switching devices 3a and 3b in accordance with the polarities of a voltage vac of the AC power source 1.

Figure 13:
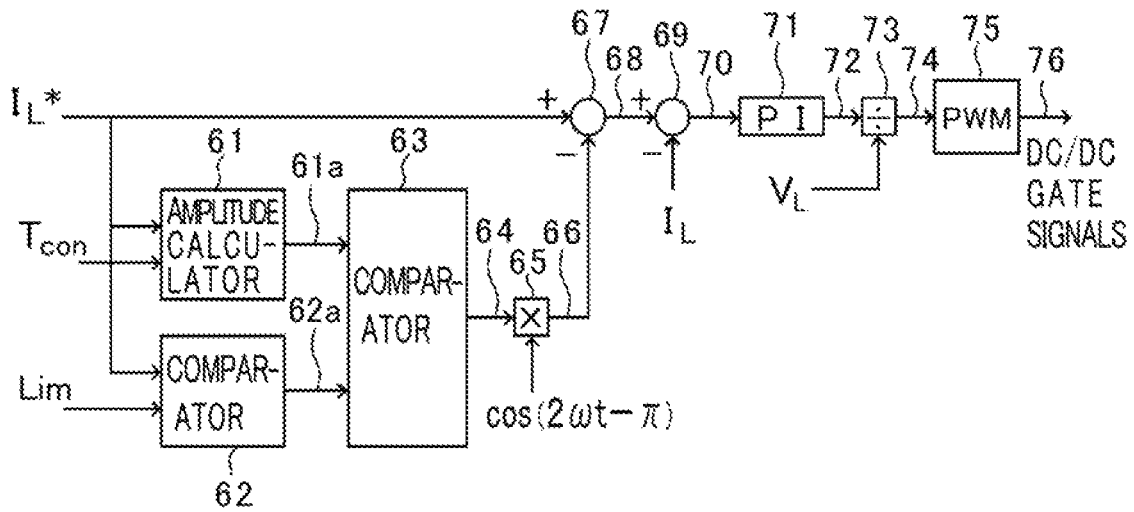
FIG. 13 is a control block diagram illustrating a configuration for generating gate signals of the DC/DC converter according to Embodiment 1.

FIG. 13 is a control block diagram in the control circuit 30 illustrating the generation of gate signals for the DC/DC converter 102. An instruction value IL* of a load current IL outputted into the load 11 is of a direct current instruction having only a direct current component, and, in FIG. 13, is indicating a constant current control for supplying a constant direct current IL into the load 11. As shown in FIG. 13, an amplitude calculator 61 calculates a ripple-current peak value 61a based on an instruction value IL* and an ambient temperature Tcon of the DC capacitor 5. Equation (11) described above is a theoretical expression of an amount reduction for a ripple voltage vc2 of the DC capacitor 5, so that the ripple-current peak value 61a is calculated by using Equation (11), for example. By modifying Equation (12) described above being obtained from Equation (11), a ripple-current peak value ($\sqrt{2}$)Irp can be calculated based on an amplitude ΔVdc of the ripple voltage vc2 of the DC capacitor 5. By using an amplitude's target value ΔVdc* of a ripple voltage vc2, an instruction value (($\sqrt{2}$)Irp)* of the ($\sqrt{2}$)Irp can be calculated from Equation (16) as follows, so that the instruction value (($\sqrt{2}$)Irp)* is set as a ripple-current peak value 61a. In this case, the ripple-current peak value 61a is theoretically a target peak value of a ripple current irp where superposition is performed on an output current iout of the DC capacitor 5.

$$((\sqrt{2})Irp) *= (Vac \cdot Iac - 2\omega Cdc \cdot Vdc \cdot \Delta Vdc*) / Vdc = \quad (16)$$

$$(VL/Vdc)IL* - 2\omega Cdc \cdot \Delta Vdc*$$

To the ripple-current peak value 61a, a limit value 62a is set. A comparator 62 compares an instruction value IL* of a load current IL with a limit value Lim being set on the load 11 in advance, and outputs a lower value between the instruction value IL* and the limit value Lim as the limit value 62a. The limitation is imposed by using the instruction value IL*, which is because of preventing a case in which an electric current's instantaneous value being supplied to the load 11 falls below 0 A to lapse into a discontinuous mode. Here, in a case in which a battery is exemplarily presumed for the load 11, the limit value Lim being set on the load 11 is a value which is specified from battery's life-span degradation due to the heat liberated by the battery in accordance with the increase of an AC component (s).

A ripple-current peak value 61a is compared with a limit value 62a by a comparator 63, and the comparator 63 outputs a lower value between the ripple-current peak value 61a and the limit value 62a as an amplitude 64 of an alternating current instruction. The control circuit 30 calculates a ripple current instruction 66 to take on an alternating current instruction by multiplying a function P, expressed by following Equation (17), by the amplitude 64 by means of a multiplier 65, where an angular frequency of an AC voltage vac expressed by Equation (3) described above is defined as "ω." The control circuit 30 determines an amplitude of the alternating current instruction, for example, in accordance with temperature characteristics of the DC capacitor 5, to be the amount or more in which, within a range on which an ambient temperature Tcon of the DC capacitor 5 is allowed to take, the capacitance of the DC capacitor 5 is reduced to the most extent, whereas a ripple voltage of the DC capacitor 5 increases.

$$P=\cos(2\omega t-\pi) \quad (17)$$

The control circuit 30 adds a ripple current instruction 66 having been calculated to an instruction value IL* of a load current IL by means of an adder 67, whereby the control circuit generates an electric current instruction value 68 including a ripple current as an output current instruction of the DC/DC converter 102.

Next, the electric current instruction value 68 is compared with a load current IL being detected, and so, a voltage instruction value 72 is calculated by means of a PI controller 71 by performing a PI control on the deviation 70 between the electric current instruction value 68 and the load current IL where the deviation has been obtained by both of them through an addition-subtraction calculator 69; and then, a duty ratio 74 is calculated by dividing the voltage instruction value 72 by a DC voltage VL of the load 11 by means of a divider 73. And in subsequence, in a PWM circuit 75, gate signals 76 for the PWM control of the DC/DC converter 102 are generated based on the duty ratio 74 by using a carrier signal. In addition, in similar processing to the control blocks shown in FIG. 12, a gate signal into each of the semiconductor switching devices 6a to 6d within the DC/DC converter 102 is generated.

Next, the explanation will be made together with the effect for a calculation method of a ripple-current peak value 61a by means of the amplitude calculator 61 based on an ambient temperature Tcon of the DC capacitor 5.

Figure 14:
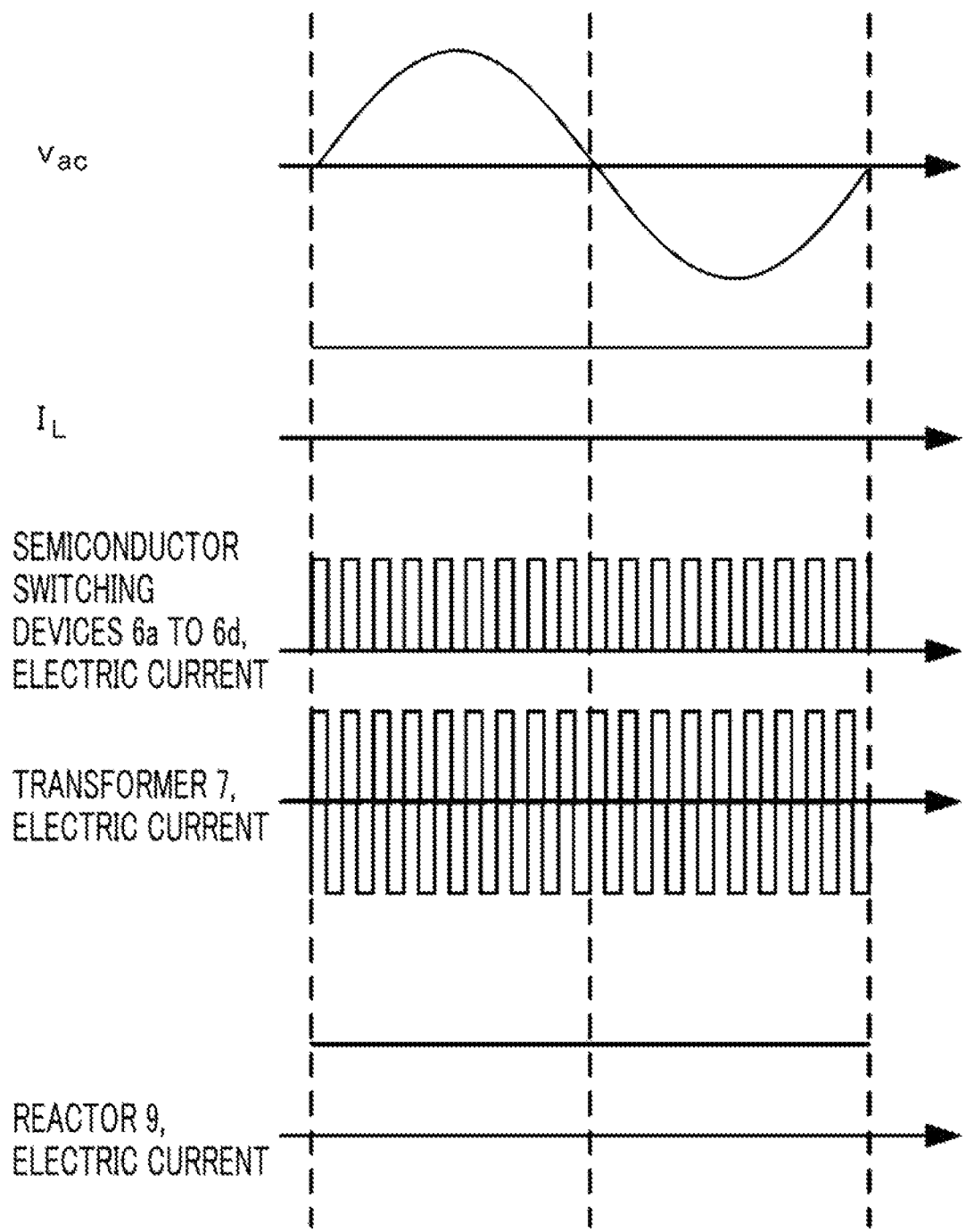
FIG. 14 is a diagram showing electric current waveforms of components constituting the DC/DC converter according to Embodiment 1.
Figure 15:
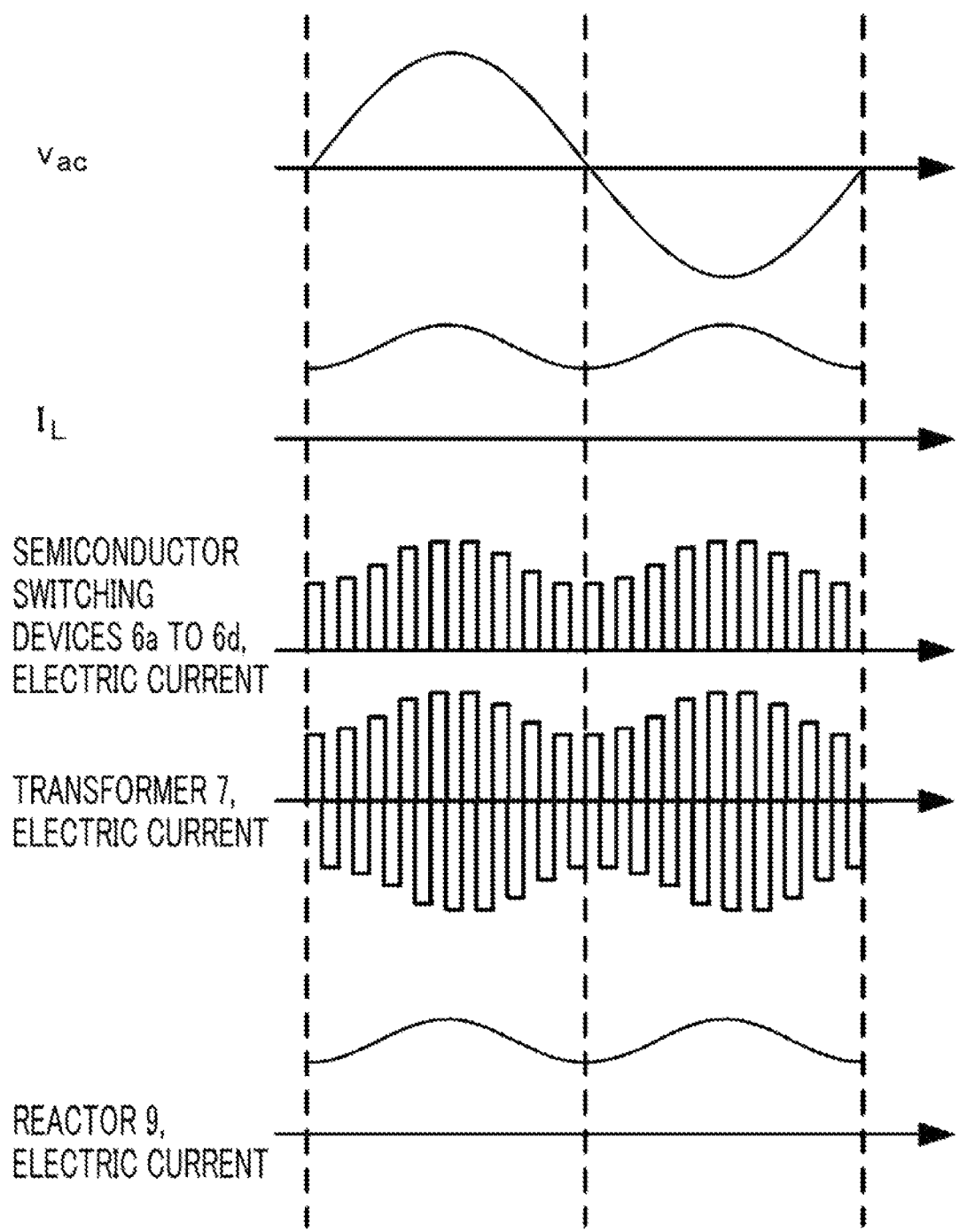
FIG. 15 is a diagram showing electric current waveforms of the components constituting the DC/DC converter according to Embodiment 1.

FIG. 14 and FIG. 15 are diagrams showing electric currents flowing through the semiconductor switching devices 6a to 6d, the transformer 7 and the reactor 9 constituting the DC/DC converter 102 in a case in which the control is performed not to add a ripple current instruction to an output current IL into the load 11, and a case in which the control is performed to add a ripple current instruction thereto, respectively. In FIG. 14, the envelopes of electric currents flowing through the semiconductor switching devices 6a to 6d, the transformer 7 and the reactor 9 are constant, whereas, in FIG. 15 in which the control is performed to add a ripple current instruction to an output current IL into the load 11, a ripple component(s) where superposition is performed on the output current IL into the load 11 appears on the envelopes of electric currents flowing through the semiconductor switching devices 6a to 6d, the transformer 7 and the reactor 9.

Due to the ripple component(s), a root-mean-square value of an electric current, Irms, which flows through the semiconductor switching devices 6a to 6d, the transformer 7 and the reactor 9 increases, so that electric conduction losses calculated by "R·Irms$^2$" increase, where a resistance value is defined as "R." The increases of temperatures in the semiconductor switching devices 6a to 6d, the transformer 7 and the reactor 9 in accordance with the ripple component where superposition is performed on the output current IL are defined as ΔTSW, ΔTTR and ΔTRe, respectively.

Figure 16:
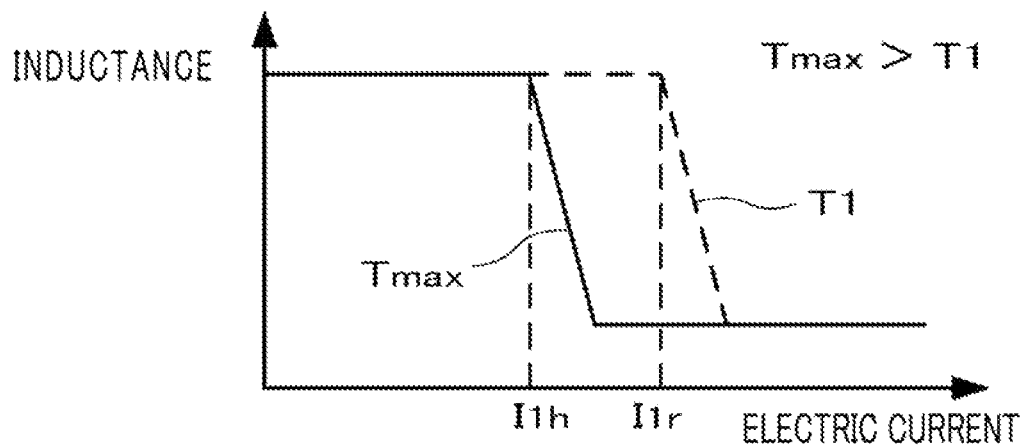
FIG. 16 is diagram showing direct current superposition characteristics of a smoothing reactor constituting the DC/DC converter according to Embodiment 1.

In addition, in FIG. 16, direct current superposition characteristics are shown when a ferrite core is exemplarily used as the core of the reactor 9. Because a ferrite core steeply saturates due to the change of magnetic flux in the core, the inductance of a reactor using the ferrite core is steeply reduced with respect to a direct current flowing through the reactor. An electric current where the inductance is reduced is defined as a value "I1." Because the higher a temperature of a ferrite core, the lower its saturated magnetic flux density becomes in general, an electric current value I1 where the inductance starts to be reduced becomes smaller when the temperature becomes higher. For example, when an electric current where the inductance is reduced at a maximum design temperature T max of the reactor 9 is defined as a value I1h, and also when a load current value where a maximum value of the amount of ripple superposition, ($\sqrt{2}$)Irp_max, is added to the load current value is defined as a value I1$r$, the difference from the maximum design temperature T max is defined as a reactor's DC superposition securement temperature $\Delta$TRe' (=T max−T1), by defining a temperature of the reactor 9 capable of securing the load current value I1$r$ as a value T1.

Figure 17:
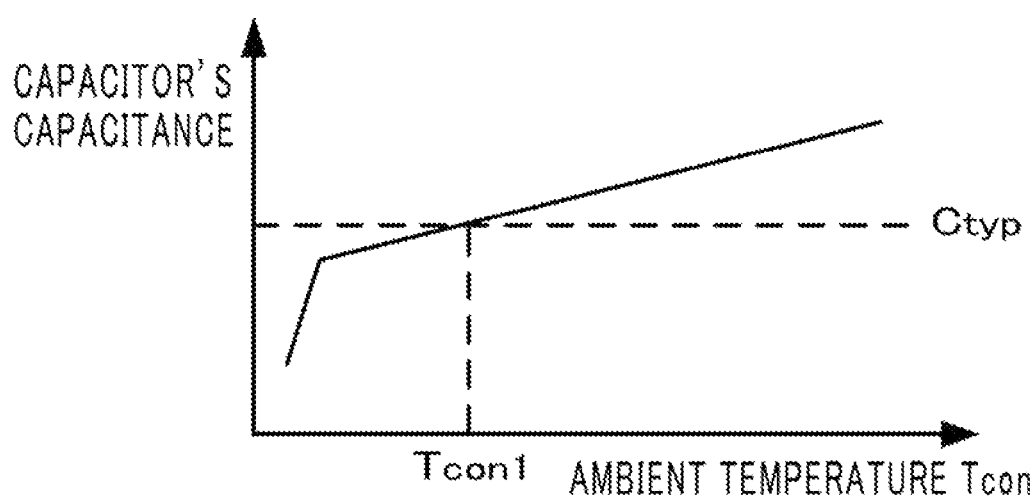
FIG. 17 is diagram showing temperature characteristics of the capacitance of the DC capacitor constituting the electrical power conversion apparatus according to Embodiment 1.

Meanwhile, when an aluminum (or aluminium) electrolytic capacitor is exemplarily used as the DC capacitor 5, there exists such tendency that the lower an ambient temperature of a capacitor is, the more its capacitance is reduced in general, as its temperature characteristics are exactly shown in FIG. 17. In addition, there are many cases in which a typical capacitance value Ctyp is specified at a typical ambient temperature Tcon1 (for example, ordinary temperature), and so, the capacitance is reduced below at the typical ambient temperature Tcon1.

Figure 18:
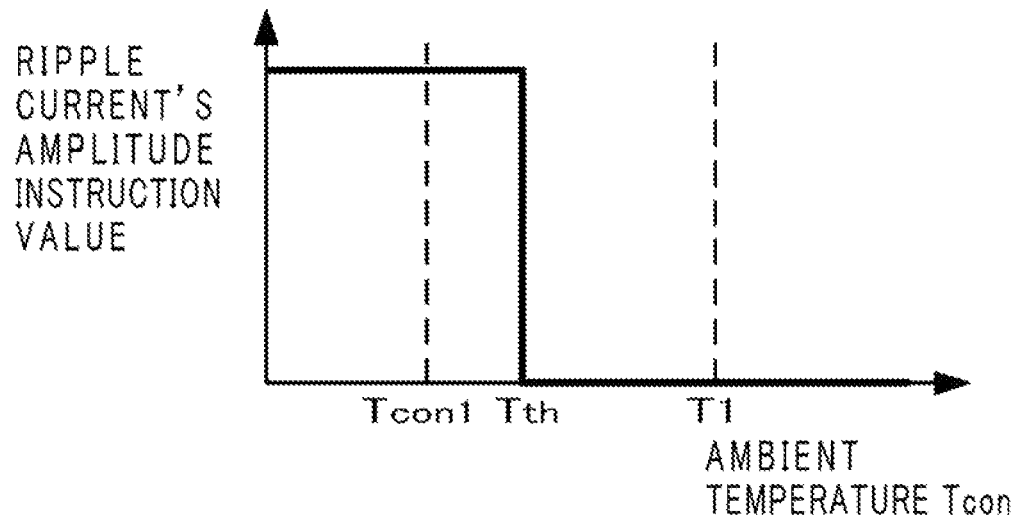
FIG. 18 is diagram showing changes of a ripple current's amplitude instruction value in accordance with temperatures in the electrical power conversion apparatus according to Embodiment 1.

In FIG. 18, shown is an example of a calculation method of a ripple-current peak value 61$a$ based on an ambient temperature Tcon of the DC capacitor 5. When an ambient temperature Tcon of the DC capacitor 5 is less than a threshold value Tth, a value expressed by Equation (16) is set as a ripple-current peak value. Meanwhile, when an ambient temperature Tcon of the DC capacitor 5 is the threshold value Tth or more, the ripple-current peak value 61$a$ is set to zero.

Here, a threshold value Tth is set to a typical ambient temperature Tcon1 specifying a typical capacitance value Ctyp of the DC capacitor 5, or more. In addition, by defining as a value $\Delta$T max in any one in the increases of respective temperatures $\Delta$TSW, $\Delta$TTR and $\Delta$TRe in the semiconductor switching devices 6$a$ to 6$d$, the transformer 7 and the reactor 9 in accordance with a ripple component where superposition is performed on a load current IL, and in the increase of a reactor's DC superposition securement temperature $\Delta$TRe', or in a maximum value among them, the threshold value Tth is set to a value T1 (=Tcon_max−$\Delta$T max) in which the value $\Delta$T max is subtracted from an ambient temperature's maximum value Tcon_max of the DC capacitor 5, or less than the value T1. The threshold value Tth is set in such a manner described above, so that it is not necessary to increase the capacitance of the DC capacitor 5 by otherwise taking into consideration of the amount of capacitance reduction due to the setting below a typical ambient temperature Tcon1 of the DC capacitor 5 in which superposition of a ripple component Irp (ripple quantity) is performed on a load current IL below the typical ambient temperature Tcon1 specifying a typical capacitance value Ctyp of the DC capacitor 5, and thus, it becomes possible to achieve miniaturization of the DC capacitor 5, and cost reduction thereof.

Moreover, the threshold value Tth is set to the value T1 or less; and also, a ripple component Irp being superimposed on a load current IL is set to zero at a value T1 or more in which the amount of the increases of respective temperatures $\Delta$TSW, $\Delta$TTR and $\Delta$TRe in the semiconductor switching devices 6$a$ to 6$d$, the transformer 7 and the reactor 9 caused by performing the ripple superposition on the load current IL, and the amount of a reactor's DC superposition securement temperature $\Delta$TRe' are subtracted from an ambient temperature's maximum value Tcon_max of the DC capacitor 5, whereby it is no more a case occurring in the increase of temperatures in the semiconductor switching devices 6$a$ to 6$d$, the transformer 7 and the reactor 9 at the time of high ambient temperatures and nor a case occurring in a shortage of DC superposition inductance of the reactor 9; and thus, it is not required to make the semiconductor switching devices 6$a$ to 6$d$, the transformer 7 and the reactor 9 in large size, and nor to reinforce cooling capacity, so that it becomes possible to achieve miniaturization of the semiconductor switching devices 6$a$ to 6$d$, the transformer 7 and the reactor 9, and lower costs thereof.

As described above, in this embodiment, the control circuit 30 performs the electric current control on the DC/DC converter 102, at the time when using an electric current instruction value 68 in which superposition of a ripple current instruction 66, taking on a minimum value at a zero-crossing phase of the AC power source 1 and taking on a maximum value at a peak phase thereof, in a two-fold frequency of the AC power source is performed on a direct current instruction (instruction value IL*) supplied to the load 11, by using an amplitude calculated by Equation (16) for an amplitude 64 of the ripple current instruction 66 when an ambient temperature Tcon of the DC capacitor 5 is less than a threshold value Tth, or by setting the amplitude 64 to zero when an ambient temperature Tcon of the DC capacitor 5 is at the threshold value Tth or more. According to this arrangement, it is achieved to curb the increase of losses at the time of high temperatures in the semiconductor switching devices 6$a$ to 6$d$, the transformer 7 and the reactor 9 constituting the DC/DC converter 102 which are caused by a ripple current where superposition is performed on a direct current supplied into the load 11, and also to curb the increase of DC superposition inductance required for the reactor 9 at the time of high temperatures, whereby, without making the semiconductor switching devices 6$a$ to 6$d$, the transformer 7 and the reactor 9 in large size, it is possible to reduce otherwise the necessity of the capacitance of the DC capacitor 5 in which its capacitance is lowered at the time of low temperatures. For this reason, miniaturization of the electrical power conversion apparatus and lower costs thereof can be achieved.

In this embodiment, an example is described in which the electric current control is performed on the DC/DC converter 102, by using an amplitude calculated by Equation (16) for an amplitude 64 of a ripple current instruction 66 when an ambient temperature Tcon of the DC capacitor 5 is less than a threshold value Tth, or by setting the amplitude 64 to zero when an ambient temperature Tcon of the DC capacitor 5 is at the threshold value Tth or more; however, it may be adopted to set the amplitude 64 that is less than the threshold value Tth and is in proportion to the amount of capacitance reduction of the capacitor. As exactly expressed by Equation (16), a ripple quantity Irp being necessary is in proportional relationship to a capacitor's capacitance Cdc with respect to a required $\Delta$Vdc. According to the control as described above, it is possible to keep the requirement of a ripple current where superposition is performed on a direct current supplied into the load 11 at a minimum, and thus, the degradation of efficiency due to the increase of losses in the semiconductor switching devices 6$a$ to 6$d$, the transformer 7 and the reactor 9 can be curbed.

In the embodiment, at the time when determining an upper limit T1 of a threshold value Tth on an ambient temperature Tcon of the DC capacitor 5, a value is set in which a value $\Delta$T max is subtracted from an ambient temperature's maximum value Tcon_max of the DC capacitor 5 by defining as the value $\Delta$T max in any one in the increases of respective temperatures $\Delta$TSW, $\Delta$TTR and $\Delta$TRe in the semiconductor switching devices 6$a$ to 6$d$, the transformer 7 and the reactor 9 in accordance with a ripple component where superposition is performed on a load current IL, and in the increase of a reactor's DC superposition securement temperature $\Delta$TRe', or in a maximum value among them; however, in a case in which an electrical power conversion apparatus undergoes cooling by means of cooling water, the value may be set in which the value ΔT max is subtracted from a cooling water temperature's maximum value Twater_max. In an electrical power conversion apparatus which is utilized for use in its high electric power density and which undergoes cooling by means of cooling water, an electrical power conversion apparatus's interior temperature (=ambient temperature of the DC capacitor 5) becomes higher in temperature than a cooling water temperature due to an influence of heat-producing components such as the semiconductor switching devices 6a to 6d, the transformer 7, the reactor 9 and the like. In addition, because temperatures of heat-producing components such as the semiconductor switching devices 6a to 6d, the transformer 7, the reactor 9 and the like undergo cooling by means of cooling water, temperature correlation to the cooling water is high. For this reason, by defining a value in which an upper limit T1 of a threshold value Tth on an ambient temperature Tcon of the DC capacitor 5 is subtracted by the value ΔT max from a cooling water temperature's maximum value Twater_max, the increase of losses at the time of high temperatures in the semiconductor switching devices 6a to 6d, the transformer 7 and the reactor 9 is more reliably curbed, so that it becomes possible to curb the increase of DC superposition inductance otherwise required for the reactor 9 at the time of high temperatures.

In the embodiment, as the DC-capacitor's temperature acquisition means 20 for measuring an ambient temperature Tcon of the DC capacitor 5, it has been shown by way of an example in which a thermistor is placed in the surroundings of the DC capacitor 5; however, it may be adopted also to use, for example, a value of a temperature sensor in use for measuring a temperature of a substrate or circuit-board, or that of a temperature sensor in use for measuring an interior temperature of an electrical power conversion apparatus's casing, or that of a temperature sensor in use for measuring a temperature of cooling water, each of which has correlation to the ambient temperature Tcon of the DC capacitor 5. It is not necessary to separately place a temperature sensor in use for measuring an ambient temperature Tcon of the DC capacitor 5, so that it is made possible to achieve miniaturization of the electrical power conversion apparatus, and lower costs thereof.

In the embodiment, it has been shown by way of an example in which MOSFETs are used as the semiconductor switching devices 6a to 6d; however, in a case of an electrical power conversion apparatus using a wide bandgap semiconductor, for example, using GaN (Gallium Nitride), electric power density is high because of miniaturization due to high-frequency switching. For this reason, the increases of respective temperatures ΔTSW, ΔTTR and ΔTRe in the semiconductor switching devices 6a to 6d, the transformer 7 and the reactor 9 in accordance with a ripple component where superposition is performed on a load current IL are large; and thus, the electric current control is performed on the DC/DC converter 102, as exactly described in the embodiment for an amplitude 64 of the ripple current instruction 66, by setting the amplitude 64 to zero when an ambient temperature Tcon of the DC capacitor 5 is at a threshold value Tth or more, whereby it is achieved to curb the increase of losses at the time of high temperatures in the semiconductor switching devices 6a to 6d, the transformer 7 and the reactor 9 constituting the DC/DC converter 102 in which the losses are caused by a ripple current where superposition is performed on the direct current supplied into the load 11, so that the effects of miniaturization of the electrical power conversion apparatus and lower costs thereof are large.

In the embodiment, an example of a totem-pole type circuit scheme has been shown as the AC/DC converter 101; however, it is not necessarily limited to this: a circuit scheme such as a single transistor type or its interleaved type, a semi-bridgeless type or the like may also be suitable for. In addition, an example of an isolated-type full-bridge converter has been shown as the DC/DC converter 102; however, it is not necessarily limited to this: a half-bridge-type DC/DC converter, or a non-isolated-type DC/DC converter may also be suitable for.

In the present application, exemplary embodiments are described; however, various features, aspects and functions described in an embodiment(s) are not necessarily limited to the applications of a specific embodiment(s), but are applicable in an embodiment(s) solely or in various combinations.

Therefore, limitless modification examples not being exemplified can be presumed without departing from the scope of the technologies disclosed in Specification of the application. For example, there exists a modification example which is included as a case in which at least one constituent element is modified, added to or eliminated from a constituent element(s) of another embodiment.

What is claimed is:

1. An electrical power conversion apparatus, comprising:
an alternating current/direct current converter for converting alternating current power from an alternating current power source into direct current power;
a direct current/direct current converter, being connected on a direct current side of the alternating current/direct current converter, for performing voltage conversion of direct current power thereon;
a direct current capacitor, being connected between the alternating current/direct current converter and the direct current/direct current converter, for smoothing electric power therebetween; and
a control circuit for controlling the alternating current/direct current converter and the direct current/direct current converter, the electrical power conversion apparatus, wherein
the control circuit is configured to:
generate an output current instruction of the direct current/direct current converter by performing superposition of an alternating current instruction, taking on a minimum value at a zero-crossing phase of the alternating current power source and taking on a maximum value at a peak phase thereof, on a direct current instruction, and
perform an output control on the direct current/direct current converter by using the output current instruction,
wherein the electrical power conversion apparatus further comprises a direct current capacitor temperature acquisition device for acquiring ambient temperature of the direct current capacitor, and
wherein the control circuit is further configured to determine an amplitude of said alternating current instruction in accordance with temperature information obtained from the direct current capacitor temperature acquisition device.

2. The electrical power conversion apparatus as set forth in claim 1, wherein the alternating current instruction is a ripple current instruction, and wherein
the control circuit configured to:
when the temperature information indicates a first temperature below a predetermined temperature threshold, set the amplitude of the ripple current instruction to a target peak value, wherein the target peak value is greater than zero, and
when the temperature information indicates a second temperature equal to or above the predetermined temperature threshold, set the amplitude of the ripple current instruction to zero.

3. The electrical power conversion apparatus as set forth in claim 2, wherein the control circuit is further configured to, when the temperature information indicates the first temperature below the predetermined temperature threshold, increase the target peak value in proportion to a decrease of a capacitance of the direct current capacitor.

4. The electrical power conversion apparatus as set forth in claim 1, wherein the direct current/direct current converter includes a reactor constituted of a ferrite core.

5. The electrical power conversion apparatus as set forth in claim 1, wherein the direct current/direct current converter has an insulating transformer for insulating in between an input of the direct current/direct current converter and an output thereof.

6. The electrical power conversion apparatus as set forth in claim 1, wherein the direct current capacitor is made of an aluminum electrolytic capacitor.

7. The electrical power conversion apparatus as set forth in claim 1, wherein the direct current/direct current converter has switching devices using a wide band-gap semiconductor as the switching devices for use in electrical power conversion.

* * * * *